(12) United States Patent  (10) Patent No.: US 8,505,519 B2
Park  (45) Date of Patent: Aug. 13, 2013

(54) PCV ANTI-FREEZING APPARATUS FOR TWO-CYLINDER ENGINE

(75) Inventor: Sung Yup Park, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 107 days.

(21) Appl. No.: 13/190,364

(22) Filed: Jul. 25, 2011

(65) Prior Publication Data

US 2012/0132158 A1  May 31, 2012

(30) Foreign Application Priority Data

Nov. 25, 2010 (KR) .......................... 10-2010-0118219

(51) Int. Cl.
*F02M 35/10* (2006.01)
(52) U.S. Cl.
USPC ..................................... 123/572; 123/184.21
(58) Field of Classification Search
USPC ............. 123/572–574, 41.86, 184.21–184.61
See application file for complete search history.

(56) References Cited

U.S. PATENT DOCUMENTS

| 3,172,399 | A | * | 3/1965 | Lentz et al. ................... 123/572 |
| 4,741,295 | A | * | 5/1988 | Hosoya et al. ........... 123/184.31 |
| 5,488,939 | A | * | 2/1996 | Nakai et al. ..................... 123/572 |
| 6,192,848 | B1 | * | 2/2001 | Hada et al. ................. 123/184.24 |
| 7,296,563 | B2 | * | 11/2007 | Yakabe et al. ........... 123/568.17 |
| 7,299,787 | B2 | * | 11/2007 | Sasaki et al. ................... 123/337 |
| 7,827,973 | B2 | * | 11/2010 | Vichinsky ..................... 123/572 |
| 2005/0263143 | A1 | * | 12/2005 | Matsuoka et al. ............ 123/572 |
| 2006/0005820 | A1 | * | 1/2006 | Jeon .............................. 123/572 |

FOREIGN PATENT DOCUMENTS

| JP | 6-229222 A | 8/1994 |
| JP | 10-299450 A | 11/1998 |
| JP | 4199465 B2 | 10/2008 |
| KR | 2003-0039470 A | 5/2003 |
| KR | 10-2005-0017461 A | 2/2005 |

* cited by examiner

*Primary Examiner* — M. McMahon

(74) *Attorney, Agent, or Firm* — Morgan, Lewis & Bockius LLP

(57) ABSTRACT

A PCV anti-freezing apparatus for two-cylinder engine may include a PCV (Positive Crankcase Ventilation) nipple connected to an intake manifold of a two-cylinder engine, and an oil separator formed within the PCV nipple.

6 Claims, 3 Drawing Sheets

PCV ANTI-FREEZING APPARATUS FOR TWO-CYLINDER ENGINE

CROSS-REFERENCE TO RELATED APPLICATION

This application claims priority to and the benefit of Korean Patent Application No. 10-2010-0118219 filed Nov. 25, 2010, the entire contents of which application is incorporated herein for all purposes by this reference.

BACKGROUND OF INVENTION

1. Field of Invention

The present invention relates to an anti-freezing apparatus. More particularly, the present invention relates to a PCV anti-freezing apparatus for a two-cylinder engine.

2. Description of Related Art

Generally in a Blow-by system, usually un-burnt gas in a combustion chamber flows into an intake manifold through a head cover for recycling. When the intake manifold is exposed to a severe cold atmosphere (e.g. about −35° C.), moisture within the Blow-by gas may be condensed and frozen into ice by the cold air at inside and outside of a PCV nipple (Positive Crankcase Ventilation nipple) and thus the PCV nipple may be blocked.

For solving the above problem, referring to FIG. 3, it is proposed to change material of a PCV nipple 120 from steel to plastic for preventing heat transfer to an aluminum intake manifold 110 and also, for preventing freezing on an end of the nipple 120 by cold air, size of the nipple 120 is enlarged.

That is, the size of the nipple 120 is enlarged for preventing freezing on the end A of the nipple 120 by contacting of blow-by gas with cold air, and material of the PCV nipple 120 is changed from steel to plastic for preventing freezing B by heat transfer.

However, although the size of the nipple is enlarged and material of the PCV nipple is changed, the blow-by gas is spread at the end of the PCV nipple and warm oil mist meets to cold air to generate moisture and thus quantity of heat of the generated moisture is relatively small to easily condensate.

That is, dew may be generated at the end of the nipple according to vehicle operation condition and then be freezed.

In the case of two-cylinder engine, oil in the blow-by gas tends to flow into one cylinder according to intake air flow direction.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a PCV anti-freezing apparatus for two-cylinder engine having advantages of separating oil from blow-by gas before reaching an end of a nipple to generating oil lump and thus to prevent freezing.

In the case of a two-cylinder engine, collected oil may be flowed into an desired intake manifold.

A PCV anti-freezing apparatus for two-cylinder engine according to various aspects of the present invention may include a PCV (Positive Crankcase Ventilation) nipple connected to an intake manifold of a two-cylinder engine and an oil separator formed within the PCV nipple.

The oil separator may include a vertical groove which is formed vertical to flow direction of blow-by gas flowing through the PCV nipple.

The oil separator may further include an oil groove which is connected to the vertical groove for guiding oil condensed at the vertical groove to the intake manifold.

The PCV nipple may be disposed between two runners of the intake manifold.

The PCV nipple may be vertically disposed to the runner of the intake manifold.

A PCV anti-freezing apparatus according to various aspects of the present invention may include an oil separator.

The PCV anti-freezing apparatus may further include a PCV (Positive Crankcase Ventilation) nipple connected to an intake manifold, and the oil separator is formed to the PCV nipple.

The oil separator may include a vertical groove which is formed vertical to flow direction of blow-by gas flowing through the PCV nipple.

The oil separator may further include an oil groove which is connected to the vertical groove for guiding oil condensed at the vertical groove to the intake manifold.

The PCV nipple may be disposed between runners of the intake manifold.

The PCV nipple may be vertically disposed to the runner of the intake manifold.

As described above, the PCV anti-freezing apparatus for two-cylinder engine according to various aspects of the present invention may separate oil from blow-by gas before reaching an end of a nipple to generate oil lump and thus freezing may be prevented.

In the case of a two-cylinder engine, collected oil may be flowed into an desired intake manifold.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a partial cross-sectional perspective view of a conventional PCV anti-freezing apparatus for.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
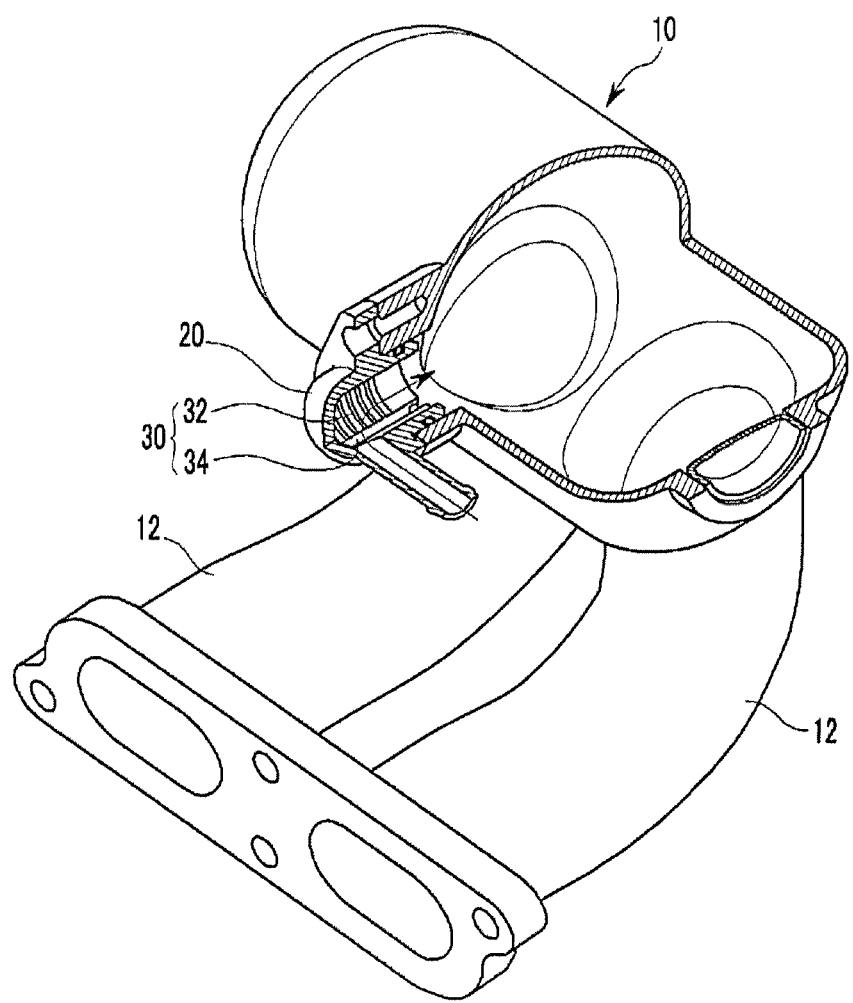
FIG. 1 is a partial cross-sectional perspective view of an exemplary PCV anti-freezing apparatus for a two-cylinder engine according to the present invention.
Figure 2:
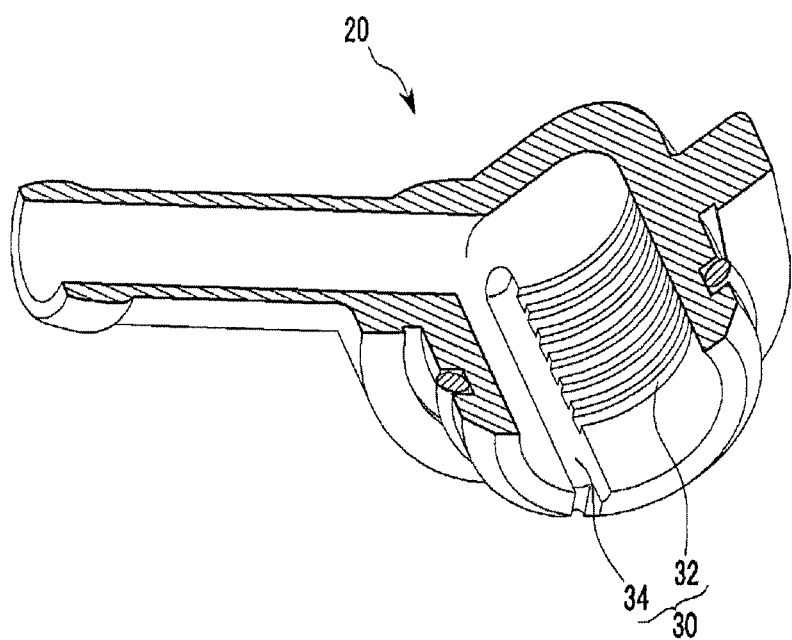
FIG. 2 is a partial cross-sectional perspective view of an exemplary PCV nipple of a PCV anti-freezing apparatus for a two-cylinder engine according to the present invention.
Figure 3:
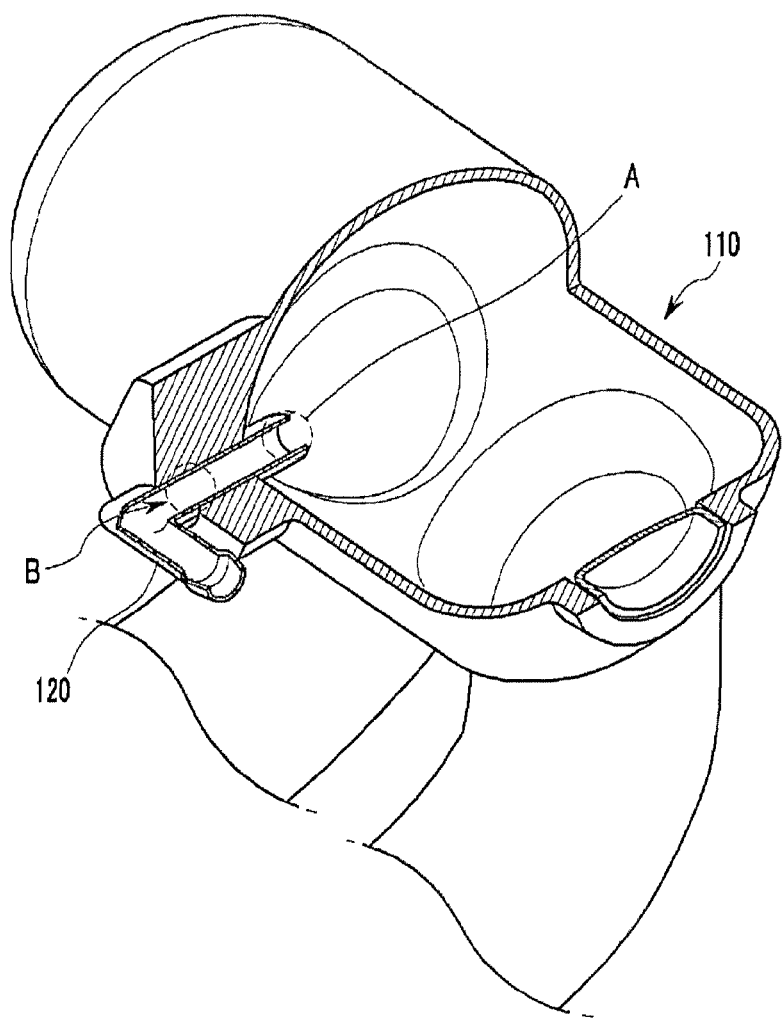

Referring to FIG. 1 and FIG. 2, a PCV anti-freezing apparatus for two-cylinder engine according to various embodiments of the present invention includes a PCV (Positive Crankcase Ventilation) nipple 20 connected to an intake manifold 10 of a two-cylinder engine and an oil separator 30 formed within the PCV nipple 20.

The oil separator 30 includes a vertical groove 32 which is formed vertical to flow direction of blow-by gas (arrow direction) flowing through the PCV nipple 20.

The oil separator 30 further includes an oil groove 34 which is connected to the vertical groove 32 for guiding oil condensed at the vertical groove 32 to the intake manifold 10.

That is, oil is separated from the blow-by gas formed as oil mist at a plurality of vertical groove 32 when the blow-by gas passes through the PCV nipple 20, and the separated oil is congregated in the oil groove 34 and then supplied to the engine.

That is, in a conventional nipple, blow-by gas is spread at the end of the PCV nipple and warm oil mist meets to cold air to generate moisture and quantity of heat of the generated moisture is relatively small to easily condensate and freeze. On the contrary, the PCV anti-freezing apparatus for two-cylinder engine according to various embodiments of the present invention may separate oil from blow-by gas before reaching an end of a nipple to generate oil lump and thus freezing may be prevented. And thus, more heat may be concentrated than heat of condensation of spread oil and thus freezing oil at the end of the nipple may be delayed. And also, moisture amount surrounding the nipple exit expect for the oil exhaust may be reduced and thus entire freezing of the nipple may be prevented.

The PCV nipple 20 is disposed between two runners 12 of the intake manifold 10.

The condensed oil through the oil separator 30 is in liquid state and the oil is not less sensitive to air flowing than the mist sate oil is, and thus the oil can be uniformly distributed to the plurality of runners 12. Particularly, the PCV nipple 20 is disposed between two runners 12 of the intake manifold 10 and thus, the oil can be distributed to two runners 12 uniformly or can be distributed to the required runners 12 so that engine performance may be enhanced.

The PCV anti-freezing apparatus of various embodiments of the present invention may be applied to 4 cylinder engine or other types' engine as well as two-cylinder engine.

The PCV anti-freezing apparatus for other types' engine is similar to the PCV anti-freezing apparatus for two-cylinder engine except for the engine types and thus detailed explanation will be omitted.

For convenience in explanation and accurate definition in the appended claims, the terms inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A Positive Crankcase Ventilation (PCV) anti-freezing apparatus for a two-cylinder engine comprising:
    a PCV nipple connected to an intake manifold of the two-cylinder engine; and
    an oil separator formed within the PCV nipple;
    wherein the oil separator comprises a perpendicular groove extending perpendicular to a flow direction of blow-by gas flowing through the PCV nipple; and
    wherein the oil separator further comprises an oil groove which is connected to the perpendicular groove for guiding oil condensed at the perpendicular groove to the intake manifold.

2. The PCV anti-freezing apparatus of claim 1, wherein the PCV nipple is disposed between two runners of the intake manifold.

3. The PCV anti-freezing apparatus of claim 2, wherein the PCV nipple is perpendicularly disposed to the runner of the intake manifold.

4. A Positive Crankcase Ventilation (PCV) anti-freezing apparatus comprising an oil separator;
    wherein the PCV anti-freezing apparatus further comprises a PCV nipple connected to an intake manifold and wherein the oil separator is formed to the PCV nipple;
    wherein the oil separator comprises a perpendicular groove extending perpendicular to flow direction of blow-by gas flowing through the PCV nipple; and
    wherein the oil separator further comprises an oil groove connected to the perpendicular groove for guiding oil condensed at the perpendicular groove to the intake manifold.

5. The PCV anti-freezing apparatus of claim 4, wherein the PCV nipple is disposed between runners of the intake manifold.

6. The PCV anti-freezing apparatus of claim 5, wherein the PCV nipple is perpendicularly disposed to the runner of the intake manifold.

* * * * *